United States Patent
Lin

(10) Patent No.: US 11,743,979 B2
(45) Date of Patent: Aug. 29, 2023

(54) FOOD WARMING DEVICE

(71) Applicant: YO-KAI EXPRESS INC., Sunnyvale, CA (US)

(72) Inventor: Chih Hung Lin, San Jose, CA (US)

(73) Assignee: YO-KAI EXPRESS INC., Sunnyvale, CA (US)

( * ) Notice: Subject to any disclaimer, the term of this patent is extended or adjusted under 35 U.S.C. 154(b) by 271 days.

(21) Appl. No.: 17/017,155

(22) Filed: Sep. 10, 2020

(65) Prior Publication Data

US 2021/0076462 A1  Mar. 11, 2021

Related U.S. Application Data

(60) Provisional application No. 62/898,653, filed on Sep. 11, 2019.

(51) Int. Cl.
| | |
|---|---|
| *H05B 6/64* | (2006.01) |
| *A47J 27/00* | (2006.01) |
| *A47J 27/04* | (2006.01) |
| *H05B 6/80* | (2006.01) |

(52) U.S. Cl.
CPC .......... *H05B 6/6497* (2013.01); *A47J 27/002* (2013.01); *A47J 27/04* (2013.01); *H05B 6/80* (2013.01); *H05B 2206/04* (2013.01)

(58) Field of Classification Search
CPC .................................................. H05B 6/6497
See application file for complete search history.

(56) References Cited

U.S. PATENT DOCUMENTS

| | | | |
|---|---|---|---|
| 5,680,810 A | | 10/1997 | Sham |
| 6,133,558 A | * | 10/2000 | Ueda ..................... H05B 6/6479 |
| | | | 219/710 |
| 2006/0088301 A1 | * | 4/2006 | Kanzaki ............... H05B 6/6479 |
| | | | 392/386 |
| 2012/0017770 A1 | | 1/2012 | Sakane et al. |
| 2018/0098391 A1 | | 4/2018 | Miyajima et al. |
| 2018/0327281 A1 | | 11/2018 | Shibuya et al. |

FOREIGN PATENT DOCUMENTS

| | | | | |
|---|---|---|---|---|
| CN | 114224165 A | * | 3/2022 | |
| KR | 2009085965 A | * | 8/2009 | ............ F24C 15/327 |
| KR | 2010048514 A | * | 5/2010 | |
| WO | WO-9504445 A1 | * | 2/1995 | ............... A21B 3/04 |

OTHER PUBLICATIONS

International Search Report and Written Opinion of the International Searching Authority for International Application No. PCT/US2020/50139, dated Nov. 30, 2020.

* cited by examiner

*Primary Examiner* — John J Norton
(74) *Attorney, Agent, or Firm* — Birch, Stewart, Kolasch & Birch, LLP

(57) ABSTRACT

A food heating device includes a placement unit and a heating unit. The placement unit includes a housing and a placement board, wherein the placement board is disposed in the housing and is for placing a food item. The heating unit includes a water injection element and a microwave element, wherein the water injection element connects to the housing and is communication with an internal space of the housing, and the microwave element connects to the housing. The microwave element is for heating by microwave the water injected into the internal space of the housing through the water injection element and producing steam therefrom.

7 Claims, 4 Drawing Sheets

FOOD WARMING DEVICE

CROSS REFERENCE

This Non-provisional application claims the priority under 35 U.S.C. § 119(a) on US Patent Provisional Application No. 62/898,653 filed on Sep. 11, 2019, the entire contents of which are hereby incorporated by reference.

FIELD OF THE INVENTION

The present invention relates to a heating device, and more particularly to a food heating device.

BACKGROUND OF THE INVENTION

Current food heating devices include microwave ovens, ovens, steamers and electric cookers. These food heating devices are respectively suitable for certain types and ranges of foods, but at the same time have limitations. For example, although being convenient for heating various types of food, microwave ovens can easily cause moisture in food to evaporate, such that heated food becomes drier and taste of the food may be affected. On the other hand, steamers can retain moisture in heated food, but a longer time is needed for heating by steamers.

SUMMARY OF THE INVENTION

One objective of the present disclosure is to provide a food heating device, comprising: a placement unit and a heating unit. The placement unit comprises: a housing; and a placement board disposed in the housing. The heating unit comprises: a water injection element connecting to the housing and being in communication with an internal space of the housing; and a microwave element emitting microwave.

In one embodiment, the heating unit further comprises: a water discharge element connecting to the housing and being in communication with the internal space of the housing for discharging water in the internal space of the housing.

In another embodiment, the food heating device further comprises: a water container disposed on a bottom of the internal space of the housing and located between the housing and the placement board.

In another embodiment, the water injection element and the water discharge element respectively connect to and are in communication with the water container.

In another embodiment, the water injection element comprises a water injection valve, the water discharge element comprises a water discharge valve, the water injection valve is disposed between the water injection element and the water container, and the water discharge valve is disposed between the water discharge element and the water container.

In another embodiment, the heating unit further comprises: a heating coil, disposed in the water container.

In another embodiment, the heating coils are plural in quantity, and the heating coils are spaced from one another and are uniformly distributed in the water container.

In another embodiment, the microwave elements are plural in quantity, and the microwave elements are spaced from one another and are uniformly distributed in the housing.

In another embodiment, the placement board comprises a plurality of holes.

In another embodiment, the placement unit further comprises: a door panel, pivotally connected to the housing for closing or opening the internal space of the housing.

In another embodiment, the device further comprising: an exhaust device disposed on the casing and being in communication with the internal space of the housing.

BRIEF DESCRIPTION OF THE DRAWINGS

The foregoing summary, as well as the following detailed descriptions of the invention, will be better understood when read in conjunction with the appended drawings. In the drawings.

DESCRIPTION OF THE INVENTION

The following embodiments when read with the accompanying drawings are made to clearly exhibit the above-mentioned and other technical contents, features and effects of the present disclosure. Through the exposition by means of the specific embodiments, people would further understand the technical means and effects of the present disclosure adopted to achieve the above-indicated objectives. Moreover, as the contents disclosed herein can be readily understood and implemented by a person skilled in the art, all equivalent changes or modifications which do not depart from the concept of the present disclosure shall be encompassed by the appended claims.

Furthermore, the terms recited in the specifications and the claims such as "above", "over", or "on" are intended not only directly contact with the other element, but also intended indirectly contact with the other element.

Figure 1:
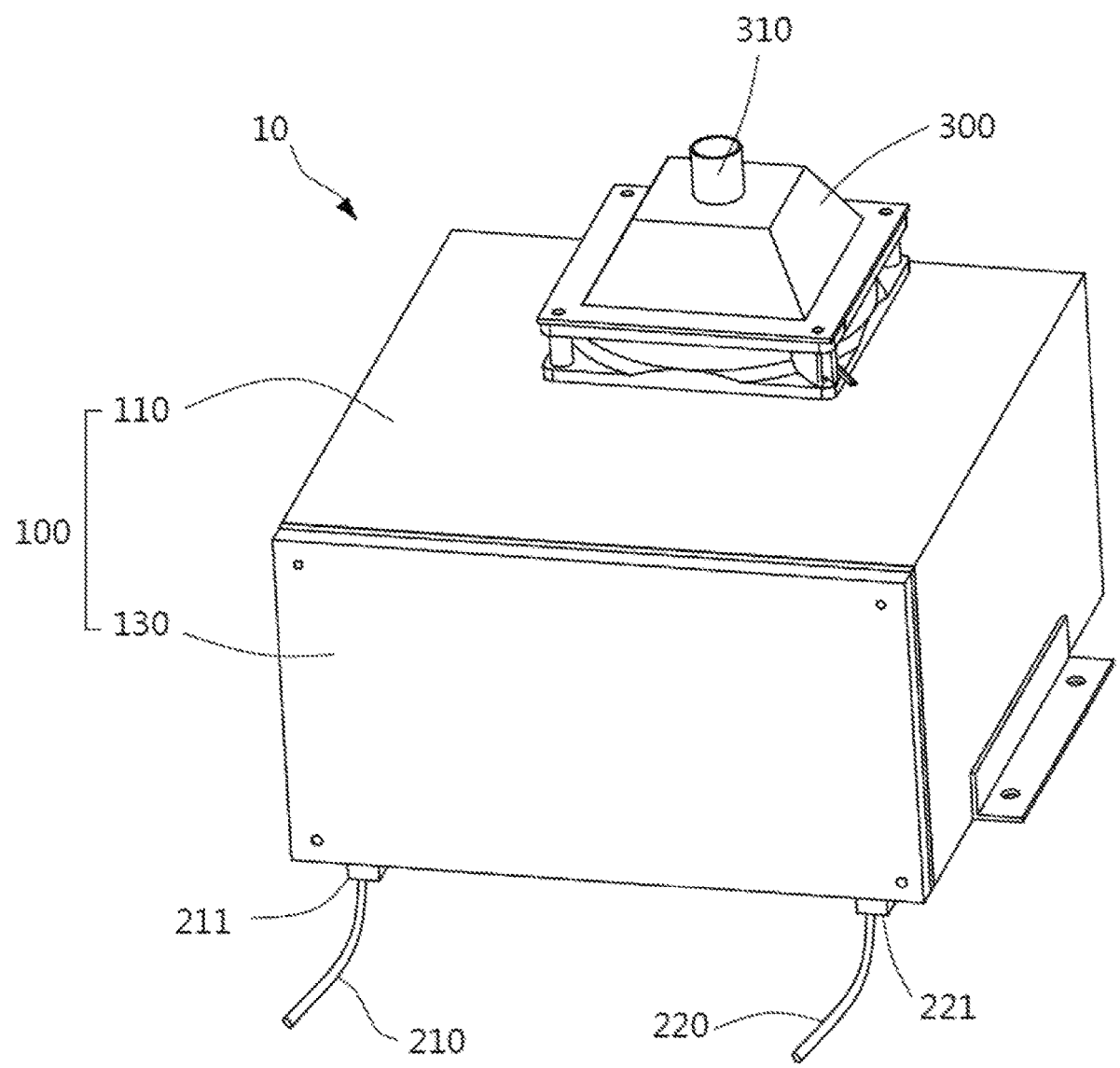
FIG. 1 is a schematic diagram of a food heating device according to an embodiment of the present invention.

Referring to FIG. 1, FIG. 1 shows a schematic view of a food heating device 10 according to an embodiment of the present disclosure. In the present embodiment, the food heating device 10 can be, for example but not limited to, a table top device that can be placed on a tabletop or an appropriate platform. In an alternative embodiment not shown in the figures, the food heating device 10 according to the present disclosure can be appropriately modified and be installed in a flood-standing frame or cabinet. In another alternative embodiment, the food heating device 10 can be appropriately modified and be installed in a food vending machine. In a more particular embodiment, the foregoing floor-standing frame, cabinet, or vending machine installed with the food heating device 10 according to the present disclosure can be further installed on a mobile device, e.g., a vehicle, a marine vessel or an aerial vehicle.

Figure 2:
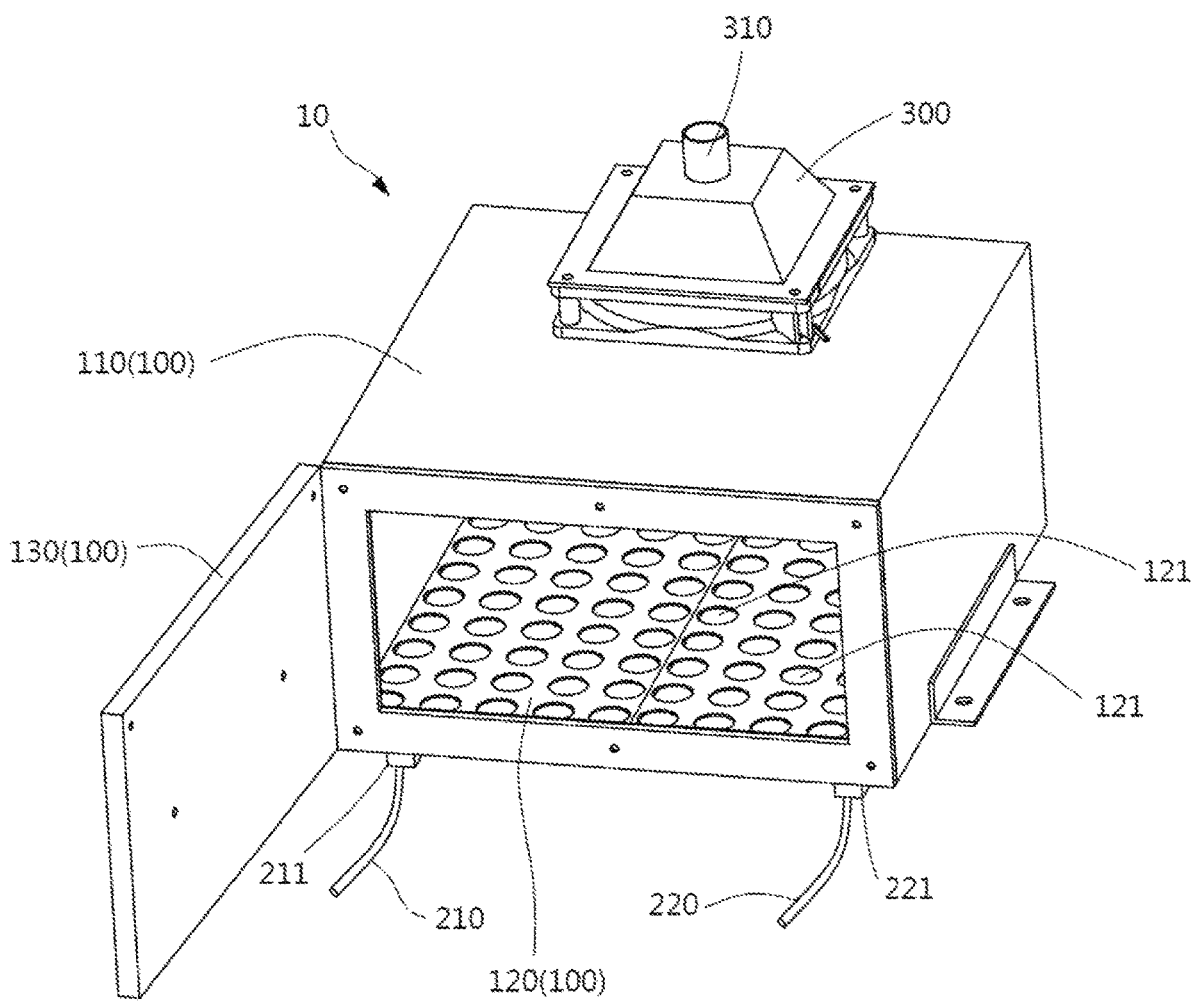
FIG. 2 is another schematic diagram of the food heating device in FIG. 1, showing the interior of the food heating device.
Figure 3:
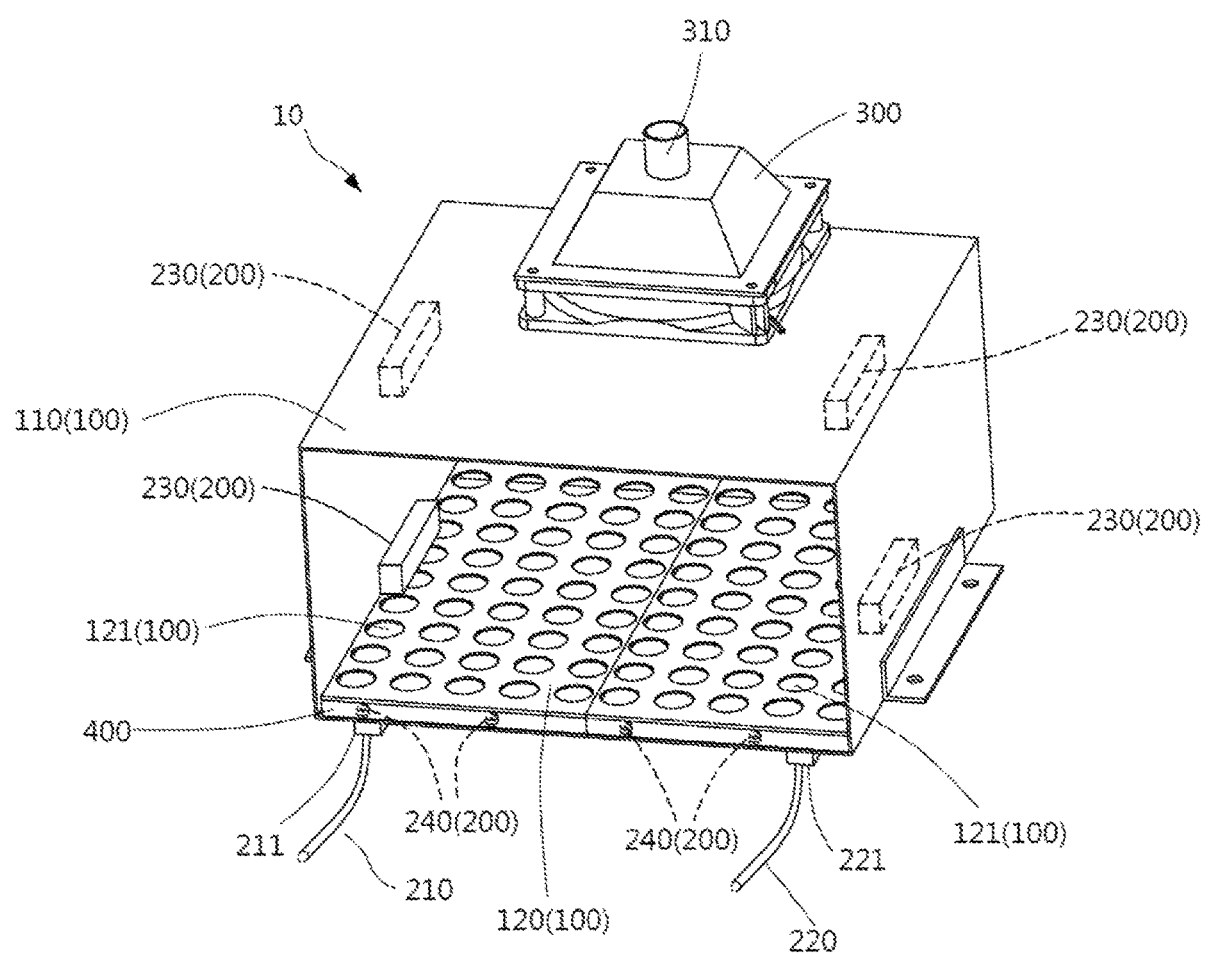
FIG. 3 is a section schematic diagram of the food heating device in FIG. 1.

Referring to FIG. 2 and FIG. 3, FIG. 2 is another schematic view of the food heating device in FIG. 1 and shows the interior structure of the food heating device 10, and FIG. 3 is a schematic sectional view of the food heating device 10 as shown in FIG. 1. In this embodiment, as shown from FIG. 1 to FIG. 3, the food heating device 10 includes a placement unit 100 and a heating unit 200. The placement unit 100 is for placing food to be heated therein; the heating unit 200 is provided correspondingly to the interior of the placement unit 100, and is capable to heat the food placed in the placement unit 100, with associated details to be described shortly.

Figure 4:
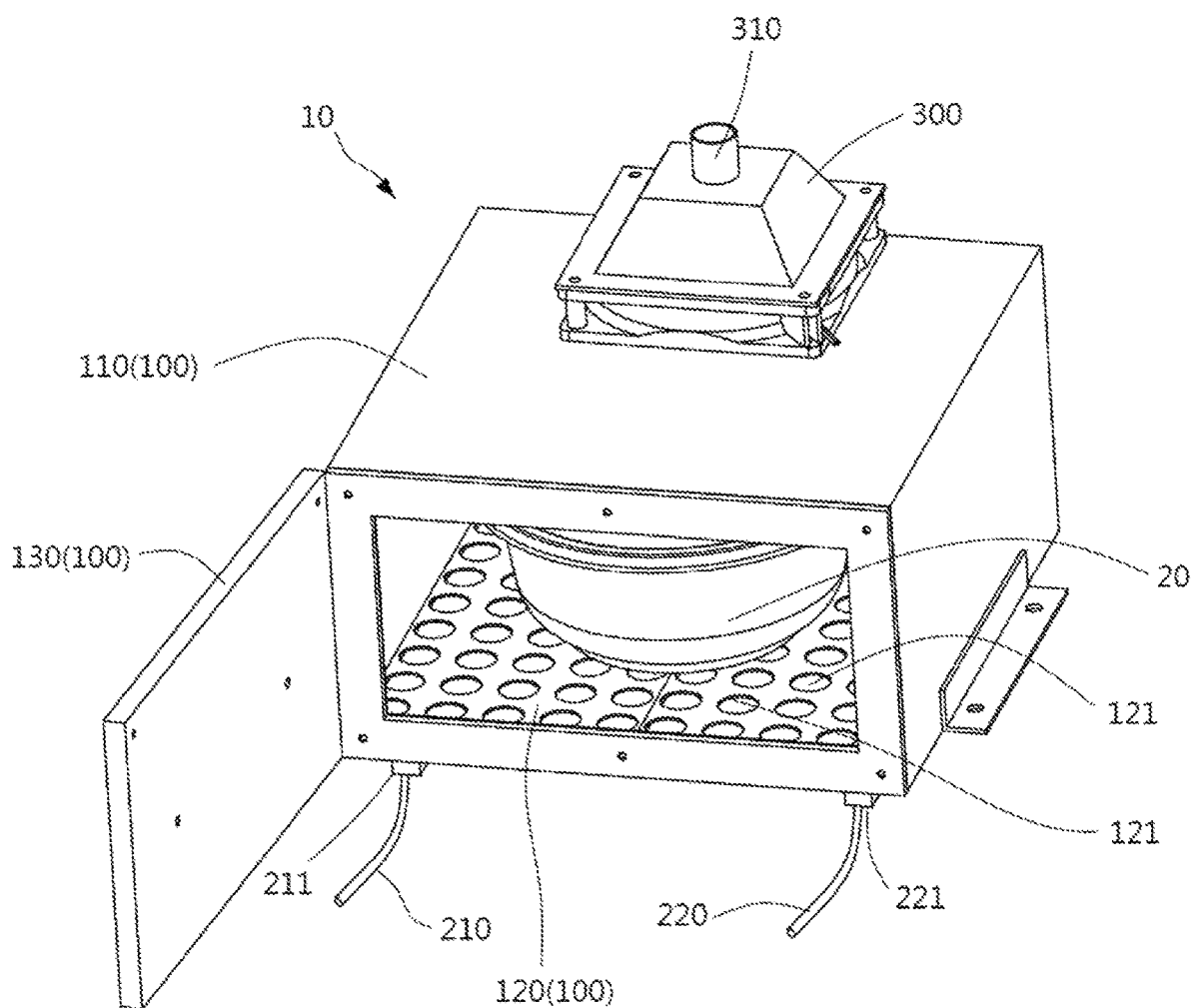
FIG. 4 is a schematic diagram of the food heating device in FIG. 1 having a food item placed therein.

Referring to FIG. 4, FIG. 4 shows a schematic view of the food heating device 10 in FIG. 1 having a food item 20 placed therein. As shown in FIG. 1 and FIG. 2, in the present embodiment, the placement unit 100 includes a housing 110 and a placement board 120, wherein the placement board 120 is disposed in the housing 110. Further, as shown in FIG. 4, the placement board 120 is for placing the food item 20 thereon. For example, the housing 110 defines an internal space, the placement board 120 is disposed on the bottom of the internal space of the housing 110, and the food item 20 holds the food to be heated. The heating unit 200 includes at least one water injection element 210 and at least one microwave element 230. The water injection member 210 connects to an opening of the housing 110 and is in communication with the internal space of the housing 110, and the microwave element 230 connects to the housing 110. During the operation process of the food heating device 10, the water injection element 210 injects water (e.g., liquid water) into the internal space of the housing 110, and the microwave element 230 emits microwave towards the internal space of the housing 110. In the present embodiment, the microwave element 230 can be, for example but not limited to, a microwave gun.

For example, the microwave element 230 can be aligned to the internal space of the housing 110. When the food item 20 holding food to be heated is properly placed on the placement board 120, microwave emitted by the microwave element 230 would cause the water molecules in the food to be heated to oscillate and produce heat energy. Further, the microwave emitted by the microwave element 230 at the same time heats the water in the internal space of the housing 110, the water heated by microwave starts to evaporate and steam, and the steam generated by the water input via the water injection element 210 would be distributed in the internal space of the housing 110 and contact with the food to be heated, so as to transmit heat energy to the food to be heated.

As shown in FIG. 3, in the present embodiment, the housing 110 is composed of a plurality of walls, and the microwave element 230 is disposed in the housing 110 and located within the wall of the housing 110. In other words, the microwave element 230, in overall appearance, is, for example but not limited to, concealed in the housing 110 (as shown in FIG. 1 and FIG. 2). For example, the walls of the housing 110 can have a bilayer structure and the microwave element 230 is disposed between the bilayer. In the present embodiment, the microwave elements 230 are plural in quantity, and the microwave elements 230 are spaced from one another and are distributed in the housing 110. For example, there are four microwave elements 230, which are symmetrically arranged on four corners of the housing 110 and are aligned to the internal space of the housing 110. However, the arrangement of the microwave elements 230 is not limited hereto and can be arranged asymmetrically.

As shown in FIG. 1 and FIG. 2, in the present embodiment, the placement unit 100 further includes a door panel 130, and the door panel 130 can be pivotally connected on the housing 110 by a pivotal element. For example, the door panel 130 can pivotally rotate relative to the housing 110 so as to close the internal space of the housing 110 (as shown in FIG. 1). Under such conditions, the food heating device 10 can activate the heating unit 200 to perform heating. Further, the door panel 130 can pivotally rotate relative to the housing 110 to open the internal space of the housing 110 (as shown in FIG. 2). Under such conditions, an user can put the food to be heated into the housing 110 or take the food which has been heated out from the housing 110. In one embodiment, the door panel 130 can include a metal shielding element (not shown in the figure) so as to obstruct the microwave emitted by the microwave element 230.

As shown in FIG. 1 to FIG. 3, in the present embodiment, the heating unit 200 further includes a water discharge element 220. The water discharge element 220 connects the housing 110 via an opening and is in communication with the internal space of the housing 110, and is for discharging the water in the internal space of the housing 110. For example, while the food heating unit 10 operates, the water injection element 210 injects water by a certain flow onto the bottom side of the internal space of the housing 110, the microwave element 230 heats the water in the internal space of the housing 110 to produce steam therefrom, and the water discharge element 220 would discharge by a certain flow the water which is not transformed to steam or which is condensed out of the housing 110. In some situations, the water injected into the internal space of the housing 110 does not completely transform into steam, and a part of water may remain, or a part of steam may condense into liquid water. At this point, such excessive water can be discharged out of the housing 110 by the water discharge element 220, so as to prevent water from accumulating in the internal space of the housing 110. In other word, during the process of heating, some of the injected water is continuously transformed into steam, while other is continuously discharged out of the housing 110.

As shown in FIG. 3, in the present embodiment, the food heating device 10 further includes a water container 400. The water container 400 is disposed on the bottom of the internal space of the housing 110, and is located between the housing 110 and the placement board 120. For example, the water container 400 is located within the wall at the bottom of the housing 110, and the placement board 120 covers the water container 400. Further, the water injection element 210 and the water discharge element 220 respectively connect to and are in communication with the water container 400. For example, while the food heating device 10 operates, the water injection element 210 injects water by a certain flow into the water container 400 on the bottom of the housing 110, the microwave element 230 heats the water in the water container 400 to produce steam therefrom, the steam rises through the placement board 120 and comes into contact with the food to be heated, and the water discharge element 220 discharges by a certain flow the water which is not transformed to steam or which is condensed out of the housing 110.

As shown in FIG. 3, in the present embodiment, the water injection element 210 includes a water injection valve 211, and the water discharge element 220 includes a water discharge valve 221. The water injection valve 211 is disposed between the water injection element 210 and the water container 400, and the water discharge valve 221 is disposed between the water discharge element 220 and the water container 400. The water injection valve 211 and the water discharge valve 221 can be individually and selectively opened or closed, allowing water or prohibiting water from passing through. For example, while the food heating device 10 operates, the water injection valve 211 is opened and the water discharge valve 221 is closed, and the water injection element 210 injects water into the water container 400 on the bottom of the housing 110, such that the water level in the water container 400 rises to a predetermined height. At this time, the microwave element 230 heats the water in the water container 400 to produce steam therefrom, and the steam rises through the placement board 120 and comes into contact with the food to be heated. Upon ending of the heating process, the water injection valve 211 is closed and the water discharge valve 221 is opened, and the water discharge element 220 discharges the water in the water container 400 which is not transformed to steam or which is condensed and falls into the water container 400 out of the housing 110.

In some embodiments, the water injection valve 211 can be closed once the water level in the water container 400 rises to the predetermined height and the heating process is not yet started. In some embodiments, the water discharge valve 221 can be opened before the heating process ends. In some embodiments, degrees of opening the water injection valve 211 or the water discharge valve 221 can be controlled, so as to further control the amount of flow of water injected by the water injection element 210 and the amount of flow of water discharged by the water discharge element 220.

As shown in FIG. 3, in the present embodiment, the heating unit 200 further includes a heating coil 240, which is disposed in the water container 400. The heating coil 240 can generate heat energy and transmit the heat energy to the water in the water container 400, thus facilitating the transformation of water to steam. For example, while the food heating device 10 operates, the water injection valve 211 is opened, the water discharge valve 221 is closed, and the water injection element 210 injects water into the water container 400 on the bottom of the housing 110, such that the water level in the water container 400 rises to a predetermined height. At this point, the microwave element 230 heats by microwave the water in the water container 400, and at the same time, the heating coil 240 is supplied with electrical current, and generate heats to indirectly heat the water in the water container 400. In some embodiments, the heating coils 240 are plural in quantity, and the heating coils 240 are spaced from one another and are distributed in the water container 400, so as to more uniformly and quickly heat the water in the water container 400. In addition, the heating coil 240 also can generate thermal radiation; for example, heat energy of the heating coil 240 can be transmitted by means of radiation, so as to heat the food to be heated located on the placement board 120.

As shown in FIG. 2 and FIG. 3, in the present embodiment, the placement board 120 includes a plurality of holes 121. When the water in the water container 400 is heated and transformed into steam, the steam can rise through the holes 121 to be uniformly distributed in the internal space of the housing 110. The holes 121 can facilitate the circulation of the steam inside the internal space, and further enable the steam to more efficiently come into contact and heat the food to be heated.

As shown in FIG. 1 to FIG. 4, in the present embodiment, the food heating device 10 further includes an exhaust unit 300. The exhaust unit 300 includes an exhaust passage 310 and is disposed on the housing 110, and the exhaust passage 310 of the exhaust unit 300 is in communication with the internal space of the housing 110. Thus, during the process of heating, the exhaust unit 300 can draw out excessive steam to prevent the steam from condensing on the top surface of the internal space of the housing 110. In some embodiments, the exhaust unit 300 further includes a fan assembly (not shown in the figure) for facilitate the efficiency of exhaust, such that the steam in the internal space of the housing 110 can be more quickly drawn through the exhaust passage 310 to the outside of the housing 110.

In conclusion, the food heating device according to the present disclosure is capable of heating food by microwave, and at the same time heating water by microwave such that the water is heated and transformed into steam, which then heats food. Food can simultaneously receive microwave heating and steam heating, hence enhancing heating efficiency as well as retaining moisture in heated food. The present disclosure not only enhances the applicability of the food heating device but also improves the issue of drying out of microwave food.

A food heating device as disclosed in any of the embodiments of the present disclosure described previously may be integrated with a platform or a carrier such as vehicles. Moreover, a food heating device as disclosed in any of the embodiments of the present disclosure described previously may be applied to any devices or service known in the art that require food heating, such as vending machine, vending mobile, convenient store vending, etc.

While preferred embodiments of the present invention have been shown and described herein, it will be obvious to those skilled in the art that such embodiments are provided by way of example only and can be implemented in combinations. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

I claim:

1. A food heating device, comprising:
    a placement unit, comprising:
        a housing; and
        a placement board disposed in the housing;
    a water container disposed on a bottom of an internal space of the housing and located between the housing and the placement board; and
    a heating unit, comprising:
        a water injection element connecting to the housing and being in communication with the internal space of the housing;
        a water discharge element connecting to the housing and being in communication with the internal space of the housing for discharging water in the internal space of the housing,
    wherein the water injection element and the water discharge element respectively connect to and are in communication with the water container;
        a heating coil, disposed in the water container; and
        a microwave element emitting microwaves.

2. The food heating device according to claim 1, wherein the water injection element comprises a water injection valve, the water discharge element comprises a water discharge valve, the water injection valve is disposed between the water injection element and the water container, and the water discharge valve is disposed between the water discharge element and the water container.

3. The food heating device according to claim 1, wherein there is a plurality of heating coils, and the heating coils are spaced from one another and are uniformly distributed in the water container.

4. The food heating device according to claim 1, wherein there is a plurality of microwave elements, and the microwave elements are spaced from one another and are uniformly distributed in the housing.

5. The food heating device according to claim 1, wherein the placement board comprises a plurality of holes.

6. The food heating device according to claim 1, wherein the placement unit further comprises:
   a door panel, pivotally connected to the housing for closing or opening the internal space of the housing.

7. The food heating device according to claim 1, further comprising:
   an exhaust device disposed on the housing and being in communication with the internal space of the housing.

\* \* \* \* \*